Sept. 27, 1955     T. E. PIAZZE     2,718,915
TUBE FORMING MECHANISM
Filed Jan. 29, 1952
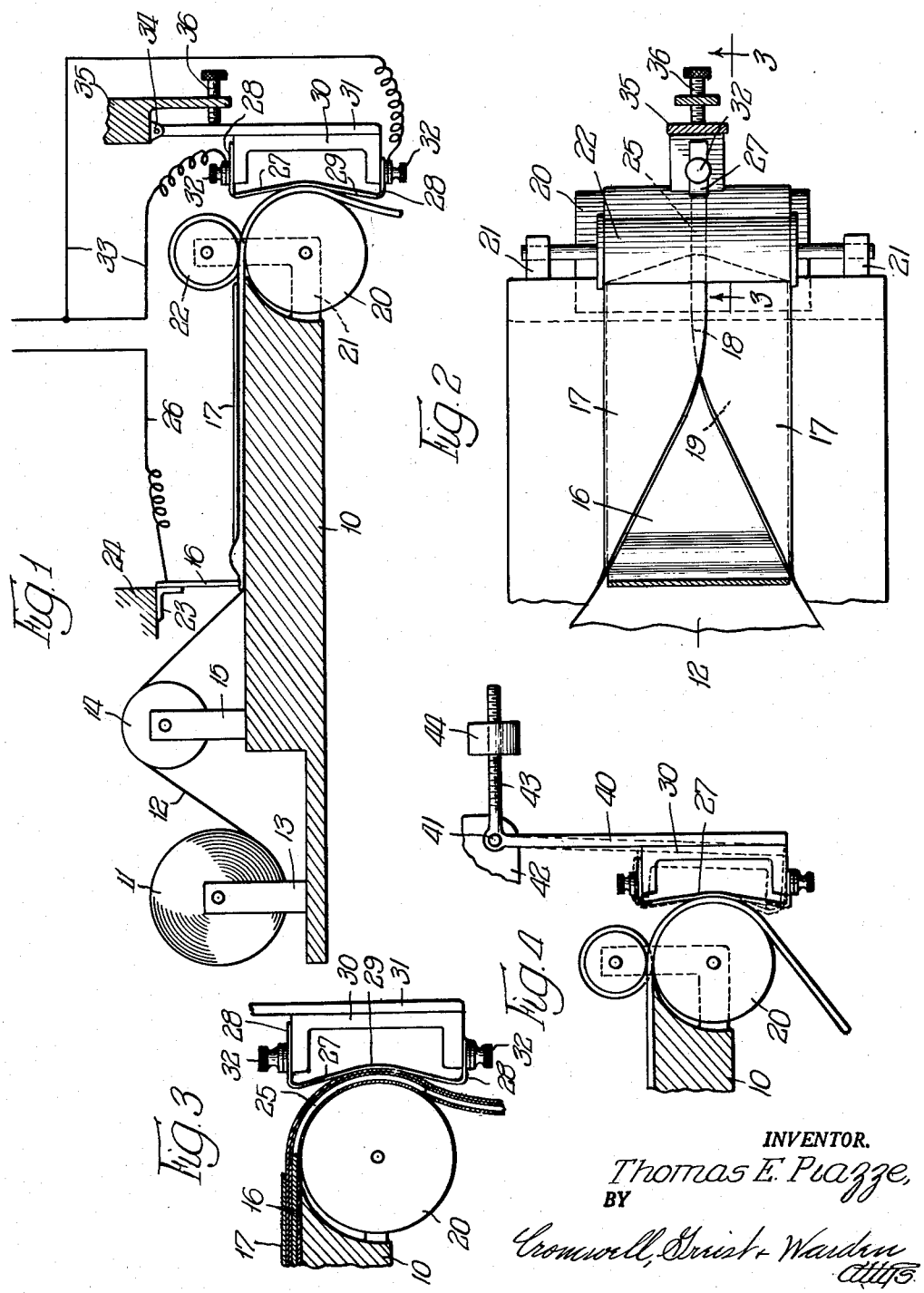
INVENTOR.
Thomas E. Piazze,
BY
Cromwell, Greist + Warden
ATTYS.

United States Patent Office 2,718,915
Patented Sept. 27, 1955

2,718,915

TUBE FORMING MECHANISM

Thomas E. Piazze, Mount Vernon, Ohio, assignor, by mesne assignments, to Continental Can Company, Inc., New York, N. Y., a corporation of New York Application January 29, 1952, Serial No. 268,860

5 Claims. (Cl. 154—1.8)

This invention relates to sealing mechanism and is more particularly concerned with a device for forming a seal between sheets or webs of heat sealable material when they are in overlapping or superimposed relation, the device being especially designed for effecting a seal between overlapped margins of a continuous web of film material to form therefrom a continuous tube structure.

It is a general object of the invention to provide a mechanism for sealing overlapped margins of a continuous web of relatively thin film material which cannot be sealed by conventional heat sealing mechanisms but which is capable of being sealed electronically by means of high frequency electric current, the heat necessary to effect the seal being generated by molecular movement in the film material which is caused by the passage of the high frequency current between electrodes positioned on opposite sides of the overlapped marginal edges of the material.

A film material with which the sealing device of the present invention is particularly adapted to be used is furnished commercially by Dow Chemical Corporation under the name of "Saran" and is understood to be a copolymer of vinylidene chloride and another compound, for example, vinyl chloride. It is a characteristic of this material that it cannot be sealed by ordinary heat sealing methods which are successfully employed with other film materials such as cellophane, Pliofilm, etc. For this reason the material has not been employed in many packaging operations where a leak-proof seal is required and where many other film materials of a similar character can be employed and provided with a satisfactory seal by conventional methods and equipment. In some operations Saran film has been employed with electronic sealing devices heretofore developed, but it has been difficult to obtain a satisfactory seal, particularly where continuous movement of a web of the material is desired in order to obtain continuous production, such as, in the making of bags, where the speed of operation desired requires continuously forming a web of the film material into a tube having a longitudinal seal and subsequently dividing the tube into sections of the required length, with one end thereof transversely sealed. The sealing devices heretofore employed in such operations have generally included an electrode positioned in fixed relation to the tube forming elements and extending into the tube along the overlapped marginal edges, which are positioned to form the longitudinal seam, and a movable or adjustable electrode supported on a shoe which is arranged to bear against the outer seam forming marginal edge of the material. This arrangement of the electrode elements frequently fails to provide a uniform seal in the overlapped material because the carrying shoe for the outer electrode is affected by irregularities and unevenness in the material against which it is urged by gravity, a pressure spring, or some similar arrangement. The shoe tends to dance or vibrate as the material moves along beneath it. This movement of the shoe due to irregularities in the material results in an uneven pressure on the material and a failure to hold the overlapped web portions in close surface contact which is necessary for a satisfactory seam. Also, with this arrangement the time during which the material is subject to the electronic action cannot be varied. Movement of the shoe tends to decrease the length of time that some portions of the material are subject to the sealing action so that it is impossible to adjust the apparatus to insure that all portions of the seal will be subject to electronic action for the same period of time.

It is a specific object of the present invention to provide apparatus for forming a continuous seam in overlapped, or superposed, portions of continuously traveling heat sealable web material, which comprise, a support for the web, having a curved portion and a fixed electrode extending around a portion of the curved path of the material, together with an adjustable electrode, which comprises a length of resilient spring material, mounted on a swingable support, and held in engagement with the outer surface of the seam forming portions of the material around a portion of the curved path, and which is adjustable, toward and from the curved support, to vary the longitudinal extent of the contact of the same with the material.

It is a still more specific object of the invention to provide a tube forming apparatus having incorporated therein an electronic sealing device which comprises a drum over which the tube forming material is guided, a resilient flexible electrode positioned in fixed relation to the periphery of the drum and extending about a portion of the same and an exterior, swingably mounted cooperating electrode formed of a strip of resilient material arranged in generally U-shaped form with the bight of the U engaged against the material as it travels over the drum and the extent of the engagement variable by adjustment of the pressure urging the electrode toward the drum.

These and other objects of the invention will be apparent from a consideration of the mechanism which is shown by way of illustration in the accompanying drawings, wherein:

Fig. 1 is a side elevation, with portions in section, showing a tube forming mechanism embodying the principles of the invention;

Fig. 2 is a plan view of the mechanism;

Fig. 3 is a section, taken on line 3—3 of Fig. 2, to a greatly enlarged scale; and Fig. 4 is a partial side elevation, with portions in section, showing a modification.

In the apparatus which is illustrated a continuous web of Saran, or any other film material having similar heat sealing characteristics, is formed into a tube with the marginal edges of the material overlapped sufficiently to provide a longitudinal seam and the overlapped margins are subject to a continuous line sealing operation to form a substantially leak-proof continuous seam therein.

The illustrated apparatus is supported on a suitable frame 10. A roll 11 of the film material 12 is supported in conventional brackets 13 at one end of the frame 10. The material 12 travels from the roll 11 upwardly over an idler roller 14 which is supported on brackets 15 upstanding from the frame 10. From the roller 14 the web 12 travels to a tube forming device which comprises an inner forming plate member 16 and outer folding shoes 17 cooperating therewith to infold the marginal edges 18 and 19 in overlapping seam forming position with one of the margins 18 positioned outwardly of the apparatus. At the other end of the frame 10 a supporting or backing roll 20 is provided for receiving in tangential relation thereon the tubed material. The tubed material travels downwardly around a portion of the periphery of the backing roll 20, the latter being mounted on brackets 21 at the end of the frame 10 with the top thereof aligned with the surface of frame 10. A guide roll 22 also mounted on the brackets 21 holds the tubed material in flattened relation on the roll 20.

The inner tube forming plate 16 is rigidly mounted by bracket 23 on a support 24 above the frame 10 and is provided at its end with a relatively narrow flexible, resilient brass electrode forming element 25 which extends a predetermined distance around the periphery of the backing roll 20 in proper position transversely of the tubed material to locate it beneath or in back of the overlapped marginal edge portions 18 and 19 thereof. The electrode 25 is suitably connected by lead 26 with a high frequency electric current source (not shown).

The other electrode comprises a relatively narrow, elongate strip of flexible, resilient brass band material 27 which is formed into generally U-shape with leg portions 28 and a bight forming portion 29. The ends or legs 28 are supported on the ends of a U-shaped bracket 30 which is mounted on a depending bar member 31. The ends 28 of the electrode 27 are provided with electrical connector elements 32 which are provided with leads 33 for connection to the current source. The bar member 31 is pivoted at 34 on a depending bracket support 35 forming part of the machine frame 10 or fixed above the same. The bar member 31 may be adjusted relative to the backing roll 19 by means of a screw 36 extending from the support 35 and engaging the bar member 31 below the pivot 34. Movement of the bar member 31 toward the roll 20 causes the resilient spring electrode 27 to engage the roll 20 over an arcuate path the length of which is determined by the adjustment of the bar 31, that is, the spring engages over a larger portion of the circumference of the roll 20 as it is moved toward the roll 20 and increases the length of the line or area of contact of the bight portion 29 with the material as it travels down over the roll.

With this arrangement of the resilient external electrode 27 the extent of the contact of the electrodes 25 and 27 with the material may be varied by adjustment of the screw 36. Any irregularities or unevenness in the material as it passes around the drum 20 is taken up by the resiliency or flexibility of the electrode 27. The bar 31 when adjusted is held against movement away from the roller 20 by the screw 36. If there are any projecting irregularities in the material the electrode 27 is not moved out of contact with the material for any appreciable time. Any increase in pressure on the contacting face of the electrode 27 due to irregularities or projections on the material tends to increase the pressure against the bight portion 29 of the same and results in an extension or elongation of the line or area of contact by the same with the material so that the period during which the material is subject to electronic action is increased.

A modification of the apparatus is shown in Fig. 4. In this form the bracket 30, on which the element 27 is secured, is mounted on a bar 40. The bar 40 is pivoted at 41 on support member 42 and provided with an arm 43 receiving in screw threaded relation thereon a weight 44. The weight 44 is adjustably positioned on the arm 43 to provide the desired pressure and length of contact between the element 27 and the material on the backing roll 20. The mechanism is otherwise the same as in the previously described form thereof.

While the illustrated mechanism is particularly adapted for tube forming operations, it will be understood that a continuous seam may be formed in material of the character involved with this apparatus without the formation of a tube structure. Also the use of the apparatus is not limited to the particular materials described.

I claim:

1. A machine for forming a tube from a web of heat sealable sheet material comprising a former plate, means for folding the material around the former plate to bring marginal portions of the material into overlapping seam forming relation, a drum at the end of said former plate, said former plate having a relatively narrow extension having a bend around a portion of the periphery of said drum in spaced relation to the surface of the same, said extension constituting an electronic sealing element extending beneath the overlapped seam forming margins of the material, a second sealing element arranged in opposed relation to the surface of said extension, a mounting means for said second sealing element, said mounting means being positioned to resiliently engage portions of the surface of said sealing element intermediate the ends thereof with the overlapped margins of the material, and means to adjust said mounting means to vary the extent of lengthwise surface engagement of said second sealing element with the overlapped margins of the material.

2. A machine for forming a tube from heat sealable material comprising a backing drum, a former plate adjacent said drum, a curved extension on said former plate arranged in spaced relation to a portion of the surface of said drum and forming one element of an electronic sealing device, a cooperating sealing element mounted adjacent said drum, said last mentioned sealing element comprising a relatively narrow, flexible band member, and means for supporting the ends of said band member with the intermediate portions of said band member being free to engage against and conform to the curved surface of said drum, and means to move said band supporting means to vary the elngth of arcuate engagement of the band member against said drum, whereby the material may be folded around the former plate to bring the marginal portions into seam forming relation between said sealing elements for welding said marginal portions into a seam while they are pressed by said elements into close surface contact.

3. A machine for continuously forming a tube from a web of heat sealable material comprising a former plate, a drum mounted for rotation adjacent the end of said former plate, a curved extension forming a sealing bar member on said former plate, said extension being arranged in spaced relation to a portion of the surface of said drum, a relatively narrow flexible sealing bar member arranged with a curved portion in spaced relation to said curved extension and means to adjust said flexible sealing bar member to vary the length of the curved portion thereof and to resiliently urge the same toward the drum in opposed relation to said extension, whereby the web may be folded around the former plate to bring the marginal portions into seam forming relation and then passed between said curved extension and the curved portion of said flexible sealing bar member with said marginal portions pressed into close surface contact between said curved extension and said sealing bar member while they are heat sealed by high frequency current passed through said extension and said sealing bar member.

4. Apparatus for forming a line seam in superimposed layers of heat sealable material comprising a backing roll for guiding and supporting the material, a sealing bar member arranged in fixed relation adjacent said backing roll, said sealing bar member being adapted to be positioned beneath the material and along the seam line, a supporting bracket of generally U-shape, a relatively flexible elongate sealing bar arranged in confronting relation with said bracket and having its ends secured to the leg portions of said bracket, a carrying bar for mounting said bracket for movement toward and from said backing roll which carrying bar is pivotally mounted on a fixed support member, and adjustable means to urge said carrying bar about its pivoted mounting whereby to bring portions intermediate the ends of the flexible sealing bar into curved flatwise resilient engagement with the material along the seam line, the length of the portions of the flexible sealing bar being varied by adjustment of said last mentioned means.

5. Mechanism for continuously forming a seam in superimposed heat sealable sheet material comprising means forming an arcuate surface for guiding and supporting the material, a sealing element adjacent said arcuate surface and in fixed relation thereto over which the material passes, a cooperating sealing device adjustably positioned in opposed relation to said fixed sealing element, said adjustable sealing device being characterized by an elongate, relatively narrow, thin, flexible strip member and a U-shaped supporting bracket, the strip member extending across the open side of the bracket with its ends attached to the ends of the leg portions of the bracket and the bracket having its open side confronting said arcuate surface to thereby position said flexible strip member in engagement with the seam forming material, and means mounting said adjustable sealing device for movement toward and from said arcuate surface whereby to vary the area of engagement of said flexible strip member with the material.

References Cited in the file of this patent

UNITED STATES PATENTS

| 1,127,494 | Nall | Feb. 9, 1915 |
| 1,924,585 | Wood | Aug. 29, 1933 |
| 2,525,356 | Hoyler | Oct. 10, 1950 |
| 2,587,211 | Piazze | Feb. 26, 1952 |

FOREIGN PATENTS

| 609,526 | Great Britain | of 1948 |